(12) United States Patent
Han et al.

(10) Patent No.: US 6,421,341 B1
(45) Date of Patent: Jul. 16, 2002

(54) HIGH SPEED PACKET SWITCHING CONTROLLER FOR TELEPHONE SWITCHING SYSTEM

(75) Inventors: Il Song Han; Young Jae Choi; Dae Hwan Kim, all of Taejeon (KR)

(73) Assignee: Korea Telecommunication Authority, Seoul (KR)

(*) Notice: Subject to any disclaimer, the term of this patent is extended or adjusted under 35 U.S.C. 154(b) by 0 days.

(21) Appl. No.: 09/173,018

(22) Filed: Oct. 15, 1998

(30) Foreign Application Priority Data

Oct. 16, 1997 (KR) .......................................... 97-53023

(51) Int. Cl.[7] .............................................. H04L 12/50
(52) U.S. Cl. ........................................ 370/360; 706/15
(58) Field of Search ................................ 370/360, 355, 370/356, 383, 387, 416, 409; 340/825.79, 825.9, 825.93; 726/33; 706/15, 16, 20, 22, 31, 33, 36, 37

(56) References Cited

U.S. PATENT DOCUMENTS

| | | | |
|---|---|---|---|
| 4,973,956 A | * 11/1990 | Lin et al. ................ | 340/825.86 |
| 5,157,632 A | * 10/1992 | Tsutsui ....................... | 365/208 |
| 5,159,590 A | * 10/1992 | Hamaguchi et al. ........ | 370/360 |
| 5,220,320 A | * 6/1993 | Assal et al. ............ | 340/825.79 |
| 5,220,559 A | * 6/1993 | Tsuzuki et al. ............. | 364/133 |
| 5,231,603 A | * 7/1993 | Luhramann ............ | 365/189.03 |
| 5,404,556 A | * 4/1995 | Mahowald et al. ...... | 364/229.5 |
| 5,448,682 A | * 9/1995 | Chung et al. ................. | 706/33 |
| 5,577,028 A | * 11/1996 | Chugo et al. ............... | 370/409 |

* cited by examiner

Primary Examiner—David Vincent
Assistant Examiner—Alexander O. Boakye
(74) Attorney, Agent, or Firm—Merchant & Gould PC

(57) ABSTRACT

This invention relates to a high speed packet switching controller in a telephone switching system which can suitably be applied to a packet controller having large capacity using a neural network chip and maximize the system performance by the optimized switching operation. The high speed packet switching controller comprises a row address decoder for decoding a weight raw address which is inputted thereto, a column address decoder for decoding a weight column address which is inputted thereto, a matrix array for providing the neural network using address signals provided from the row address decoder and column address decoder and outputing varied voltage in accordance with an external weight value, a neural network for producing a final crossbar switching control signal, an external input/output bus for transmitting an output signal of the neural network, and an internal neural data bus for transmitting the address signal output from the row address decoder and column address decoder to the matrix array.

5 Claims, 3 Drawing Sheets

… (US 6,421,341 B1)

HIGH SPEED PACKET SWITCHING CONTROLLER FOR TELEPHONE SWITCHING SYSTEM

CROSS REFERENCE TO RELATED APPLICATION

This application claims priority from Korean Patent Application No. P97-53023, filed on Oct. 16, 1997, which is hereby incorporated by reference in its entirety.

BACKGROUND OF THE INVENTION

1. Field of the Invention

This invention relates to a high speed packet switching controller in a telephone switching system which improves the system performance using optimized switching operations and, more particularly, allows the system to be applied to a circuit requiring high speed and large capacity characteristics by controlling a crossbar switch which receives packet data and switches among suitable output lines.

2. Description of the Prior Art

A conventional switching system is generally suitable for small capacity use in order to satisfy the switching speed with its performance. Specifically, a crossbar switch is well known to the conventional switching system as a representative switch which provides superior ability in view of the system performance.

However, when the speed of the input packet is high and the communication circumstances have various multimedia data services with large switching capacity, the system performance of a small switching system will suddenly decrease. Accordingly, the small switching system is not suitable for a high speed/large switching system. Also, if the small switching system and programs executing the switching operation change to meet the changed system circumstance, many limitations should be considered.

SUMMARY OF THE INVENTION

Therefore, it is an object of the present invention to provide a high speed packet switching controller in a telephone switching system which can suitably be applied to a packet controller having large capacity which uses a neural network chip while maximizing the system performance by optimizing the switching operation.

It is another object of the present invention to provide a telephone switching system for a high speed/large switching capacity.

In order to achieve the above object, a high speed packet switching controller comprises a row address decoder for decoding a weight raw address which is inputted thereto; a column address decoder for decoding a weight column address which is inputted thereto; a matrix array for using the address signals provided from the row address decoder and column address decoder, and outputting varied voltage in accordance with an external weight value; a neural network for producing a final crossbar switching control signal; an external input/output bus for transmitting an output signal of the neural network; and an internal neural data bus for transmitting the address signal output from the row address decoder and column address decoder to the matrix array.

In order to achieve another object, there is provided to a telephone switching system, having a high speed packet switching controller using a neural network chip, an input buffer unit for storing a packet data inputted into the telephone switching system; a crossbar switching unit for switching a transmission line of the packet data output by the input buffer unit into other transmission lines, and a neural network switching control unit for controlling the switching operations of the crossbar switching unit.

Accordingly, an analog/digital super-high density integrated circuit for applying a communication system is achieved, and also, parallel hardware using a neural network chip for a switching controller having high speed/large capacity are provided according to the features of the present invention.

BRIEF DESCRIPTION OF THE DRAWINGS

The above object and other features of the present invention will become more apparent by describing the preferred embodiments thereof with reference to the accompanying drawings, in which.

DETAILED DESCRIPTION OF THE PREFERRED EMBODIMENT

Now, the preferred embodiments of the present invention configured as above are explained in detail in connection with the attached drawings.

Figure 1:
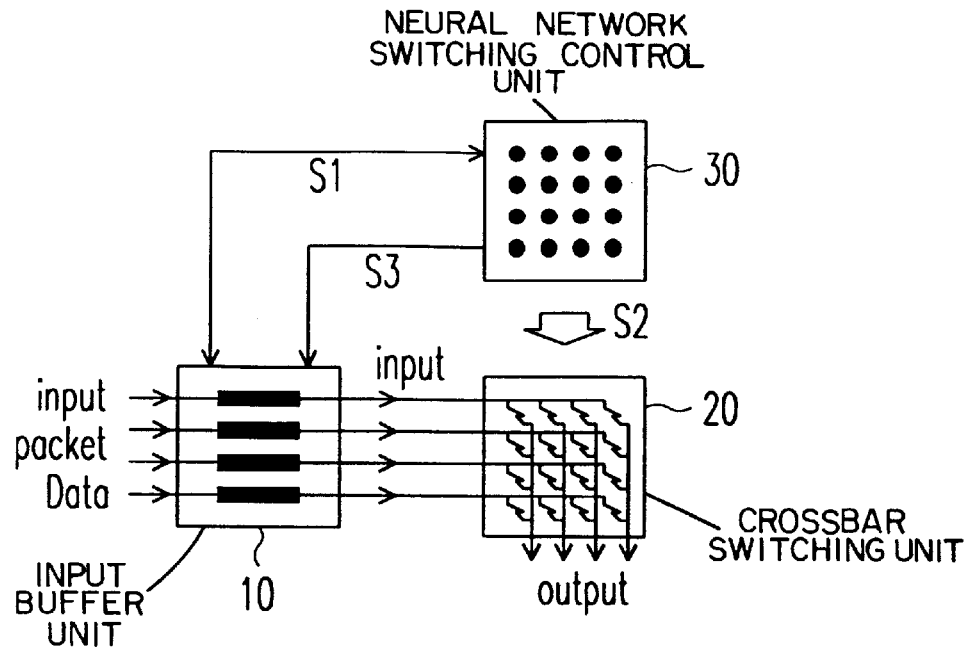
FIG. 1 is a block diagram illustrating a telephone switching system having a high speed packet switch controller according to the present invention.
Figure 2:
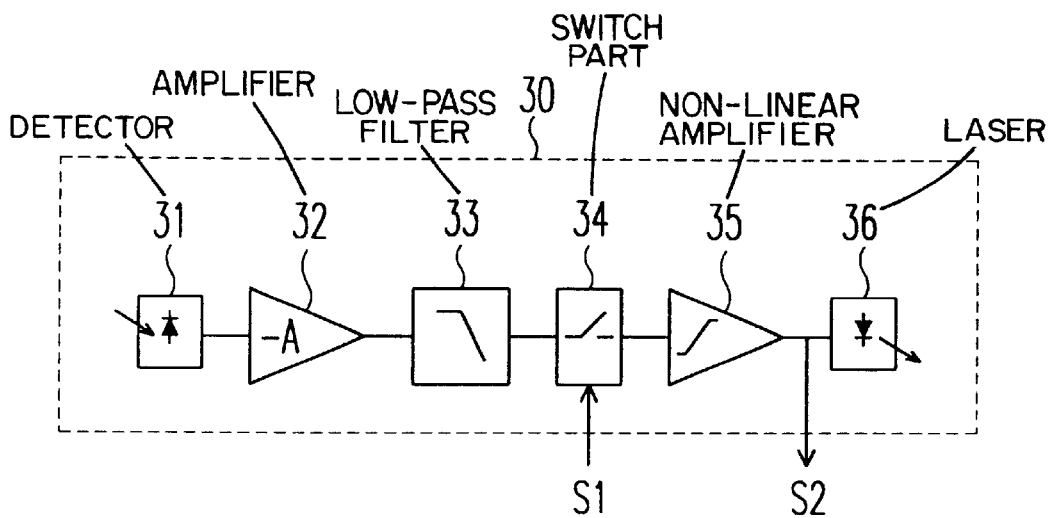
FIG. 2 is a block diagram illustrating a neural network switching unit shown in FIG. 1 according to the present invention.

FIG. 1 is a block diagram illustrating a telephone switching system having a high speed packet switch controller according to the present invention.

With reference to FIG. 1, a telephone switching system having a high speed packet switch controller using a neural network chip comprises an input buffer unit 10 for storing packet data inputted into a telephone switching system; a crossbar switching unit 20 for switching a transmission line of the packet data output by the input buffer unit 10 into other transmission lines; and a neural network switching control unit 30 for controlling the switching operations of the crossbar switching unit 20.

The neural network switching control unit 30 includes a detector 31 for detecting the input packet data, an amplifier 32 for amplifying the packet data output from the detector 31, a low-pass filter 33 for filtering the noise components contained in the output signal of the amplifier 32, a switch part 34 for connecting or disconnecting the output signal of the filter 33 in accordance with a connection request signal S1 output from the input buffer unit 10, a non-linear amplifier 35 for amplifying the signal passed through the switch part 34, and a laser 36 for transmitting the packet data output from the non-linear amplifier 35 to transfer other transmission lines.

It is noted that the switch part 34 and the non-linear amplifier 35 are the major parts of the neural network switching control unit 30 embodied by using a neural network chip. A part of the signal output by the non-linear amplifier 35 controls the crossbar switching unit 20 to connect a selected switch and output a crosspoint set control signal S2 to disconnect next switches connected to the selected switch.

Also, the switch part 34 includes a matrix ring part 341 for varying the output voltage in accordance with an input weight value, a switch SW1 connected to the matrix ring part 341 for switching the output signal of the connection ring, and a switch SW2 for switching an input connection when the weight value is required.

The matrix ring part 341 includes an N-MOS transistor N1 whose gate terminal receives the weight value, an N-MOS transistor N2 whose source terminal is connected to a drain terminal of the N-MOS transistor N1, an N-MOS transistor N3 whose drain terminal is connected to a source terminal of the N-MOS transistor N1, and a N-MOS transistor N4 whose gate terminal is connected to a gate terminal of the N-MOS transistor N3 and the source terminal of the N-MOS transistor N1, a P-MOS transistor P1 whose gate terminal receives an external voltage and whose source terminal is connected to a gate terminal of the N-MOS transistor N2 and whose drain terminal is connected to a drain terminal of the N-MOS transistor N4, and an N-MOS transistor N5 whose source terminal is connected to the common line b provided between the source terminal of the P-MOS transistor P1 and the drain terminal of the N-MOS transistor N4 whose gate terminal receives the input neural value.

Here, the transistors N1 through N4 serve as a current mirror which repeats current magnitude formed from an input branch to another branch as its magnitude.

Figure 3:
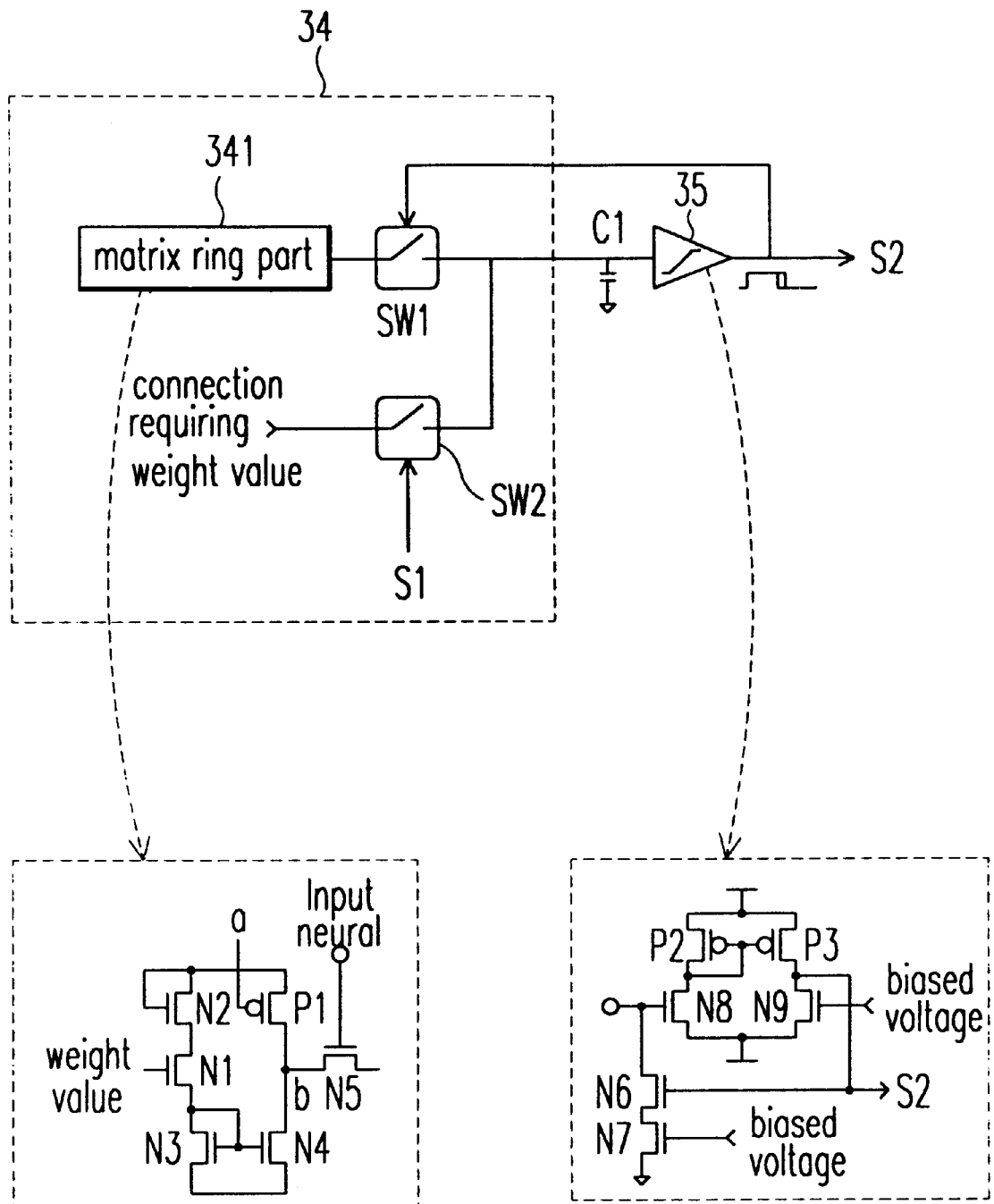
FIG. 3 is a circuit diagram illustrating a switching unit and non-linear amplifier shown in FIG. 2 according to the present invention.

In FIG. 3, if a signal is inputted to an external input terminal a, the voltage value biased at point b is varied in accordance with the weight value inputting to the gate terminal of N-MOS transistor N1. Consequently, the varied voltage is inputted to the non-linear amplifier 35 through the N-MOS transistor N5 which is switched on or off according to the input neural value.

Also, the non-linear amplifier 35, as shown in FIG.3, includes an N-MOS transistor N6 whose drain terminal is connected to one side of the capacitor C1, an N-MOS transistor N7 whose drain terminal is connected to a source terminal of the N-MOS transistor N6, an N-MOS transistor N8 whose gate terminal is connected to one side of the capacitor C1, a P-MOS transistor P2 whose source terminal is connected to a drain terminal of the N-MOS transistor N8, a P-MOS transistor P3 whose drain and source terminals are connected to that of the P-MOS transistor P2, respectively, and an N-MOS transistor N9 whose drain terminal is connected to a source terminal of the P-MOS transistor P3.

Here, the transistors N6, through N8, P2 and P3 serve as a current mirror which repeat current magnitude formed from an input branch to another branch as its magnitude. If the output signal of the non-linear amplifier 35 is extracted from a common line provided between the current mirror and the N-MOS transistor N9, the output signal may be the crossbar control signal S2.

Figure 4:
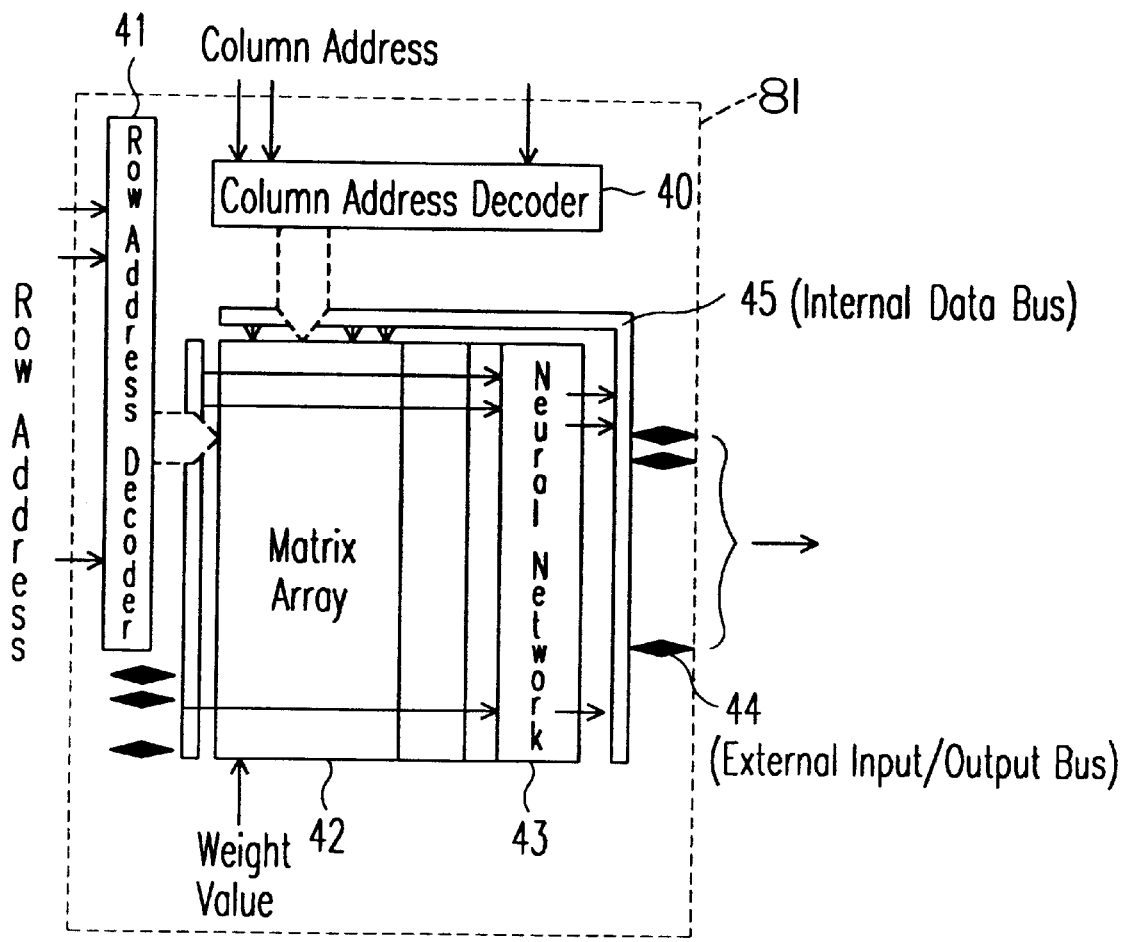
FIG. 4 is a block diagram illustrating a neural network chip using a plurality of switching units and non-linear amplifiers shown in FIG. 3 according to the present invention.

FIG. 4 is a block diagram illustrating a neural network chip, i.e. neural network controller, using a plurality of switching parts and a non-linear amplifiers shown in FIG. 3 according to the present invention.

With reference to FIG. 4, the neural network chip comprises a row address decoder 41 for decoding a weight raw address which is inputted thereto; a column address decoder 40 for decoding a weight column address which is inputted thereto; a matrix array 42 for providing the neural network using address signals provided from the row address decoder 41 and column address decoder 40, and outputting a varied voltage in accordance with an external weight value; a neural network 43 for producing a final crossbar switching control signal S2; an external input/output bus 44 for transmitting an output signal of the neural network 43; and an internal neural data bus 45 for transmitting the address signal output from the row address decoder 40 and the column address decoder 41 to the matrix array 42.

FIG. 4 shows the 81 neural packet switch controller for a 9×9 packet switch system. However, the capacity may be freely extended to a designer's purpose.

The operation of the high speed switching controller of the present invention will now be described with reference to FIGS. 1 through 4.

If the packet data is inputted to the telephone switching system, the packet data is first stored into the input buffer unit 10. The input buffer unit, 10 detects a header of the input packet to extract an output address, and outputs a connection requirement signal S1 requiring switching connection into the neural network switching unit 30. The neural network switching unit 30 decodes the address detected from the header by row and column matrix, respectively. Accordingly, the crossbar switch control signal S2 connects a corresponding switch of the crossbar switching unit 20 and then performs the switching operation, or disconnects next switches connected to the corresponding switch to prevent from flowing to other lines.

Thus, the high speed packet controller using the neural network of the present invention has a 2 dimensional neural matrix, and each neural outputs each input packet by controlling each switch.

If a neural is connected to a corresponding matrix ring of each neural network, any other neurals which are connected to the same row and column matrix are disconnected.

As a result of the above feature of the matrix ring, a neural which maintains a connected state when the energy converges at the minimum states can control the corresponding switch to perform optimized switching control.

Also, if an URAN of the neural network chip is implemented to the neural network high speed packet switch controller of the present invention, the system performs with at least 15 to 60 megabit per second. It means that the speed is equivalent to a computing speed of 100 gigabit to 1 terabit.

Also, the neural network switching controlling unit 30 outputs a packet selection signal S3 to the input buffer unit 10, so that the packet data is outputted to the crossbar switching unit 30 through the present switching line.

The switching operation described above connects an output address during a switching period for correct switching performance.

As described above, the present invention provides a high speed packet switching controller in a telephone switching system which can suitably be applied to the large capacity packet controller using a neural network chip and can maximize the system performance by the optimized switching operation.

Many modifications and variations of the present invention are possible in light of the above teachings. Therefore, it is to be understood that within the scope of the appended claims, the invention may be practiced otherwise than as specifically described.

What is claimed is:

1. A high speed packet switching controller comprising:
   a row address decoder for decoding a weight row address which is inputted thereto;

a column address decoder for decoding a weight column address which is inputted thereto;

a matrix array for outputting varied voltage in accordance with an external weight value in accordance with weight row address and column address signals;

a neural network for producing a final crossbar switching control signal; and a internal neural data bus for transmitting said weight row address and column address signals;

wherein said neural network comprises:

a matrix ring part for varying output voltage in accordance with an input weight value; and at least a non-linear amplifier for amplifying an output signal of said matrix ring part.

2. The switching controller of claim 1, wherein said matrix array comprises:

a first current mirror for repeating a current magnitude formed from an input branch to another branch as its magnitude;

a first P-MOS transistor with gate terminal receiving an external voltage and other terminals being connected to the first current mirror; and a first N-MOS transistor with source terminal connect5ed to a common line formed between said first P-MOS transistor and said first N-MOS transistor for switching on/off according to an input neural value which is inputted to a gate terminal of said first N-MOS transistor.

3. The switching controller of claim 2, wherein said first current mirror comprises a second N-MOS transistor with gate terminal receiving the weight value, a third N-MOS transistor with source terminal being connected to a drain terminal of said first N-MOS transistor, a fourth N-MOS transistor with drain terminal being connected to a source terminal of said second N-MOS transistor, and a fifth N-MOS transistor with gate terminal common-connected to a gate terminal of said fifth N-MOS transistor.

4. The switching controller of claim 1, wherein said non-linear amplifier comprises:

a second current mirror for repeating a current magnitude formed from an input branch to another branch as its magnitude;

a second P-MOS transistor with drain and source terminals connected to said second current mirror; and a sixth N-MOS transistor with drain terminal connected to the source terminal of said second P-MOS transistor.

5. The switching controller of claim 4, wherein said second current mirror comprises:

a seventh N-MOS transistor with drain terminal connected to one side of said capacitor;

an eighth N-MOS transistor with drain terminal connected to a source terminal of said seventh N-MOS transistor;

a ninth N-MOS transistor with gate terminal connected to said one side of said capacitor; and a third P-MOS transistor with source terminal connected to a drain terminal of said ninth N-MOS transistor.

* * * * *